(12) United States Patent
Valdez et al.

(10) Patent No.: US 7,243,949 B2
(45) Date of Patent: Jul. 17, 2007

(54) STRUCTURAL MEMBER FOR VEHICLE BODY AND FRAME ASSEMBLY INCLUDING INTERNAL AIR TANK

(75) Inventors: Juan F. Valdez, Reading, PA (US); Paul A. Christofaro, Exeter, PA (US)

(73) Assignee: Dana Corporation, Toledo, OH (US)

( * ) Notice: Subject to any disclaimer, the term of this patent is extended or adjusted under 35 U.S.C. 154(b) by 300 days.

(21) Appl. No.: 10/744,913

(22) Filed: Dec. 23, 2003

(65) Prior Publication Data

US 2004/0150209 A1 Aug. 5, 2004

Related U.S. Application Data

(60) Provisional application No. 60/436,970, filed on Dec. 30, 2002.

(51) Int. Cl.
*B62D 21/00* (2006.01)
(52) U.S. Cl. ...................... 280/782; 280/783
(58) Field of Classification Search ............... 280/783, 280/782; 180/274; 293/106, 107; *B62D 21/16*
See application file for complete search history.

(56) References Cited

U.S. PATENT DOCUMENTS

| | | | | |
|---|---|---|---|---|
| 1,177,007 A | * | 3/1916 | Auerbacher | ............... 296/37.13 |
| 1,198,885 A | * | 9/1916 | Billinghurst | ......... 280/124.163 |
| 1,264,094 A | * | 4/1918 | Laisne | ......................... 280/783 |
| 1,995,088 A | * | 3/1935 | Bellamy | ..................... 293/106 |
| 2,517,860 A | | 8/1950 | Forgy | |
| 3,338,614 A | * | 8/1967 | Sadler, Jr. | ................... 293/106 |
| 3,764,174 A | * | 10/1973 | Taninecz | .................... 293/107 |
| 3,860,258 A | | 1/1975 | Feustel et al. | |
| 3,880,445 A | * | 4/1975 | Chieger | ...................... 280/783 |
| 5,368,121 A | | 11/1994 | Priefert | |
| 5,460,420 A | * | 10/1995 | Perkins et al. | .............. 293/106 |
| 5,632,471 A | | 5/1997 | Pradel | |
| 5,727,815 A | | 3/1998 | Smith | |
| 5,908,204 A | | 6/1999 | Smith | |
| 6,398,236 B1 | | 6/2002 | Richardson | |
| 6,746,031 B2 | * | 6/2004 | Carlstedt | ............. 280/124.107 |

FOREIGN PATENT DOCUMENTS

| | | | |
|---|---|---|---|
| DE | 39 40 250 | | 6/1991 |
| EP | 1245476 A1 | * | 10/2002 |
| FR | 2678867 A1 | * | 1/1993 |
| JP | 09002323 A | * | 1/1997 |
| JP | 10250386 A | * | 9/1998 |

* cited by examiner

*Primary Examiner*—Paul N. Dickson
*Assistant Examiner*—Tiffany L. Webb
(74) *Attorney, Agent, or Firm*—MacMillan, Sobanski & Todd, LLC

(57) ABSTRACT

A structural member for use in a vehicle body and frame assembly includes an internal air tank for supplying pressurized air to an auxiliary device, such as an active suspension for the vehicle. The internal air tank may be generally cup-shaped, including a closed end portion, a plurality of side portions, and an outwardly extending flange portion that extends about an open end portion. The flange portion is secured to a first portion of the closed channel structural member to define an air-tight chamber. The chamber is adapted to selectively receive and store a quantity of a pressurized fluid therein, and further to selectively discharge such pressurized fluid to an auxiliary device. An opening can be formed through the structural member to facilitate fluid communication with the chamber. Alternately, the internal air tank may include a flexible bladder defining an air-tight chamber.

13 Claims, 5 Drawing Sheets

STRUCTURAL MEMBER FOR VEHICLE BODY AND FRAME ASSEMBLY INCLUDING INTERNAL AIR TANK

CROSS REFERENCE TO RELATED APPLICATION

This application claims the benefit of U.S. Provisional Application No. 60/436,970, filed Dec. 30, 2002, the disclosure of which is incorporated herein by reference.

BACKGROUND OF THE INVENTION

This invention relates in general to body and frame assemblies for vehicles. In particular, this invention relates to an improved structure for a closed channel structural member for use in such a vehicle body and frame assembly that includes an internal air tank for supplying pressurized air to an auxiliary device, such as an active suspension for the vehicle.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

Traditionally, the various components of vehicular body and frame assemblies have been formed from open channel structural members, i.e., structural members that have a non-continuous cross sectional shape (such as U-shaped or C-shaped channel members, for example). For example, it is known to use one or more open channel structural members to form the side rails, the cross members, and other components of a ladder frame type of separate body and frame assembly. However, the use of open channel structural members to form the various components of vehicular body and frame assemblies has been found to be undesirable for several reasons. To address this, it has been proposed to form one or more of the components of the vehicular body and frame assemblies from closed channel structural members, i.e., structural members that have a continuous cross sectional shape (such as tubular or box-shaped channel members, for example). This cross sectional shape is advantageous because it provides strength and rigidity to the vehicle body and frame component. Also, closed channel structural members are well suited to be deformed to a desired shape by hydroforming, which is a well known process that uses pressurized fluid supplied within the closed channel structural member to deform it into conformance with a surrounding die. Hydroforming has been found to be a desirable forming process, because portions of a closed channel structural member can be quickly and easily deformed to have a complex cross sectional shape.

In some vehicles, an auxiliary device is provided that utilizes pressurized air as the actuating medium. For example, in some active suspension systems, pressurized air is utilized to selectively increase or decrease the dampening characteristics of the shock absorbers. Auxiliary systems of this general type typically include a tank or canister that is charged with a quantity of pressurized air. The tank of pressurized air functions as an accumulator that can provide a quantity of pressurized air to the auxiliary system immediately upon demand. Traditionally, the tank of pressurized air has been provided as a separate component that has been welded or otherwise secured to the vehicle frame assembly or other portion of the vehicle. Although effective, this arrangement has been found to consume an undesirable amount of physical space in the vehicle. Thus, it would be desirable to provide an improved structure for such a tank of pressurized air that consumes less space in the vehicle.

SUMMARY OF THE INVENTION

This invention relates to an improved structure for a closed channel structural member for use in such a vehicle body and frame assembly that includes an internal air tank for supplying pressurized air to an auxiliary device, such as an active suspension for the vehicle. The internal air tank may have any desired shape to facilitate placement within a structural member. In a preferred embodiment, the internal air tank may be generally cup-shaped, including a closed end portion, a plurality of side portions, and an outwardly extending flange portion that extends about an open end portion. The flange portion may be secured to a first portion of a closed channel structural member to define an air-tight chamber. For additional stability and strength, the closed end portion of the internal air tank may be secured to a second portion of the closed channel structural member. The chamber is adapted to selectively receive and store a quantity of a pressurized fluid therein, and further to selectively discharge such pressurized fluid to an auxiliary device. An opening may be formed through the closed channel structural member to facilitate fluid communication with the chamber, although such is not required.

In an alternate embodiment, the internal air tank may include a bladder disposed within a structural member. The bladder defines an air-tight chamber.

In a further alternate embodiment of the invention, a pair of baffle plates are attached to the interior of a structural member in a spaced relationship to define an air-tight chamber.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
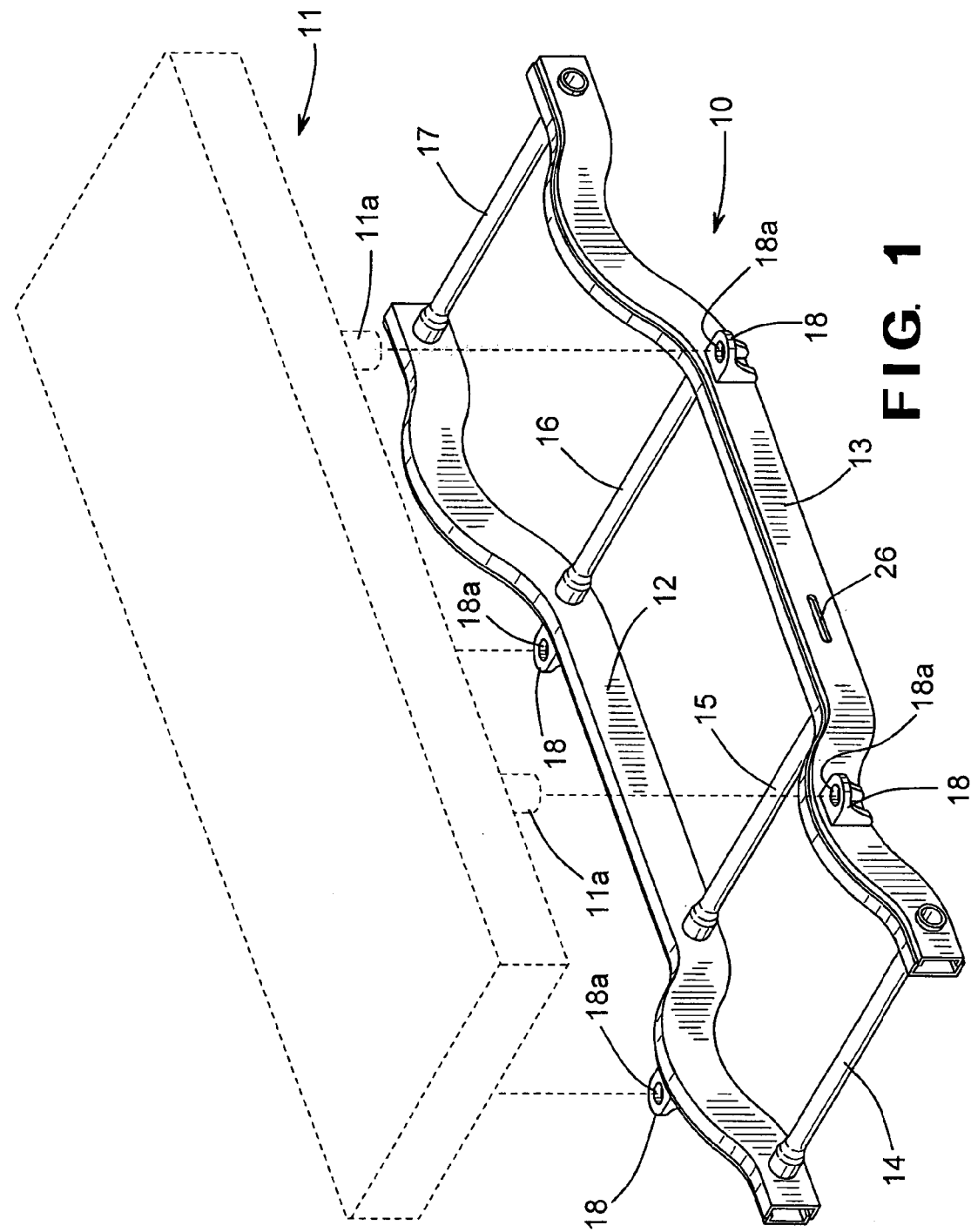
FIG. 1 is an exploded perspective view of a vehicle body and frame assembly including a first embodiment of a closed channel structural member having an internal air tank for supplying pressurized air to an auxiliary device in accordance with this invention.

Referring now to the drawings, there is illustrated in FIG. 1 a portion of a vehicular body and frame assembly in accordance with this invention. The illustrated vehicular body and frame assembly is, in large measure, conventional in the art and is intended merely to illustrate one environment in which this invention may be used. Thus, the scope of this invention is not intended to be limited for use with the specific structure for the vehicular body and frame assembly illustrated in FIG. 1 or with vehicular body and frame assemblies in general. On the contrary, as will become apparent below, this invention may be used in any desired environment for the purposes described below.

The illustrated vehicular body and frame assembly is a separate type of body and frame assembly, including a frame portion, indicated generally at 10, and a body portion, indicated generally at 11. The illustrated frame portion 10 of the vehicular body and frame assembly is a ladder type frame portion, including a pair of longitudinally extending side rails 12 and 13 having a plurality of transverse cross members 14, 15, 16, and 17 extending therebetween. The side rails 12 and 13 extend longitudinally throughout the entire length of the frame portion 10 and are generally parallel to one another. Each of the side rails 12 and 13 in the illustrated embodiment is formed from a pair of C-shaped open channel structural members (see, for example, the side rail sections 13a and 13b for the side rail 13 shown in FIGS. 2, 3, and 4) that are secured together, such as by welding, to form a closed channel structural member having an upper wall, a lower wall, and a pair of side walls. However, it is known that one or both of the side rails 12 and 13 may be formed from a single piece of material. Also, one or both of the side rails 12 and 13 may be formed from a plurality of individually formed closed channel structural members that are secured together by any conventional means, such as by welding, riveting, bolting, and the like. Furthermore, it is known that portions of the side rails 12 and 13 may be formed from open channel structural members.

The cross members 14 through 17 extend generally perpendicular to the side rails 12 and 13 and may be formed having any conventional structure. The cross members 14 through 17 are spaced apart from one another along the length of the frame portion 13 and can be secured to the side rails 12 and 13 by any conventional means, such as by welding, riveting, bolting, and the like. When secured to the side rails 12 and 13, the cross members 14 through 17 provide lateral and torsional rigidity to the frame portion assembly 10 of the vehicular body and frame assembly. The cross members 14 through 17 may be formed from either closed channel structural members or open channel structural members, or a combination of both.

A plurality of body mount support brackets 18 are provided on the vehicle frame assembly 10. The illustrated body mount support brackets 18 are stamped members that are secured to the side rails 12 and 13 of the vehicular body and frame assembly 10 by any conventional means, such as by welding, adhesives, and the like. The body mount support brackets 18 are provided to facilitate the connection of the body portion 11 and other various components (not shown) of the vehicle to the vehicular body and frame assembly 10. To accomplish this, each of the body mount brackets 18 has an opening 18a formed therethrough. The openings 18a are sized in accordance with respective body mounts 11a provided on the body portion 11 of the vehicular body and frame assembly 10. In a manner that is well known in the art, the body mounts 11a are received and supported within the openings 18a of the body mount support brackets 18 to connect the body portion 11 to the frame portion 10.

In a preferred embodiment, an internal air tank, indicated generally at 20, is provided within a portion of the side rail 13. The internal air tank 20 may be provided at any desired location within the side rail 13, and multiple internal air tanks 20 may be provided at different locations within the side rail 13 if desired. A similar internal air tank (not shown), or a plurality of similar internal air tanks, may also be provided within the other side rail 12, the cross members 14 through 17, or any other structural member of the frame portion 10 of the vehicular body and frame assembly. Furthermore, this invention may be practice by providing similar internal air tanks within any of the structural members of a unitized body and frame assembly, such as described above. Lastly, this invention may be practiced by providing the internal air tank or tanks within either closed channel or open channel structural members of the frame portion 10 of the vehicular body and frame assembly.

Figure 2:
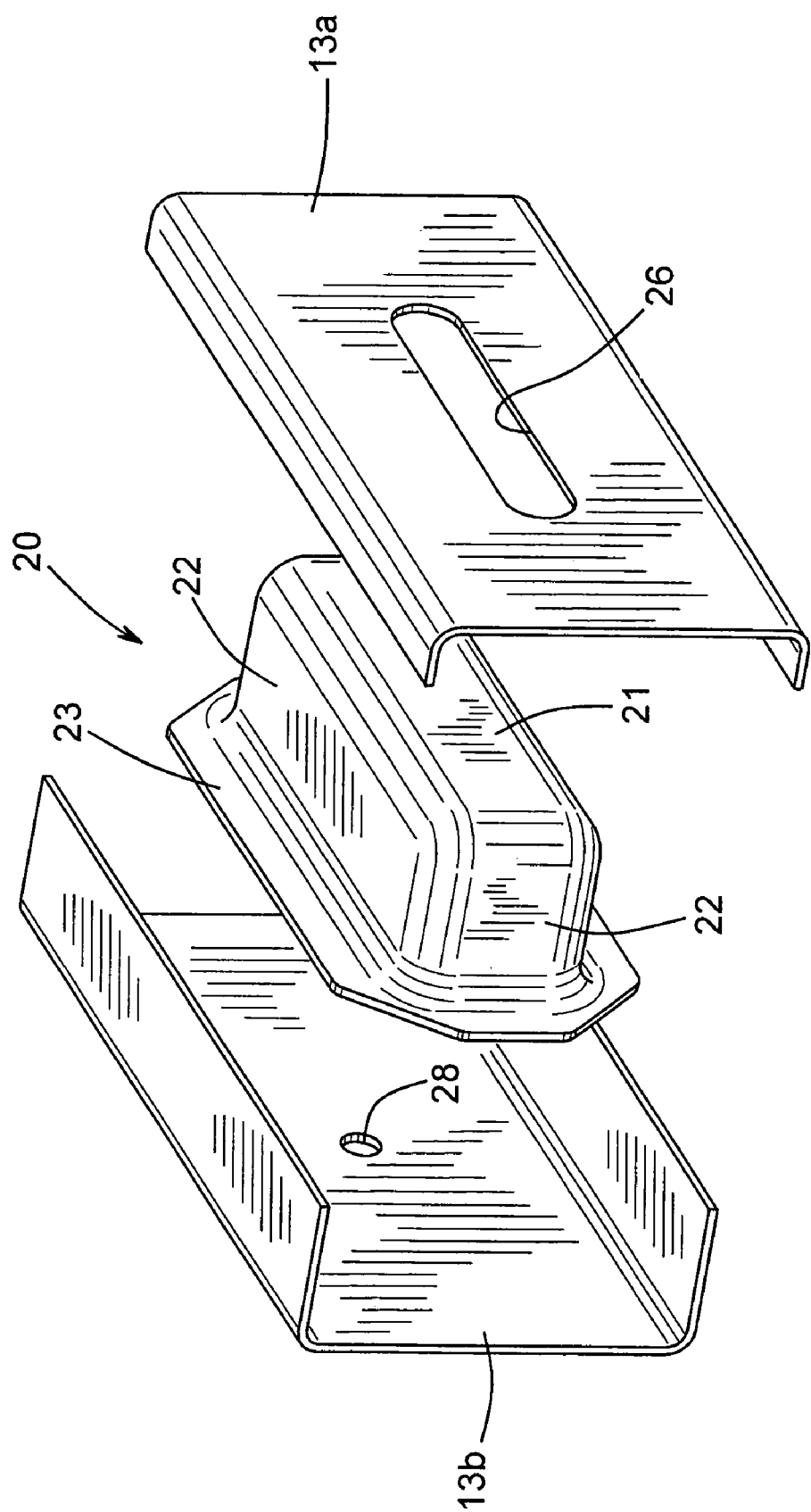
FIG. 2 is an enlarged exploded perspective view of a portion of the first embodiment of the closed channel structural member illustrated in FIG. 1 showing the internal air tank.
Figure 4:
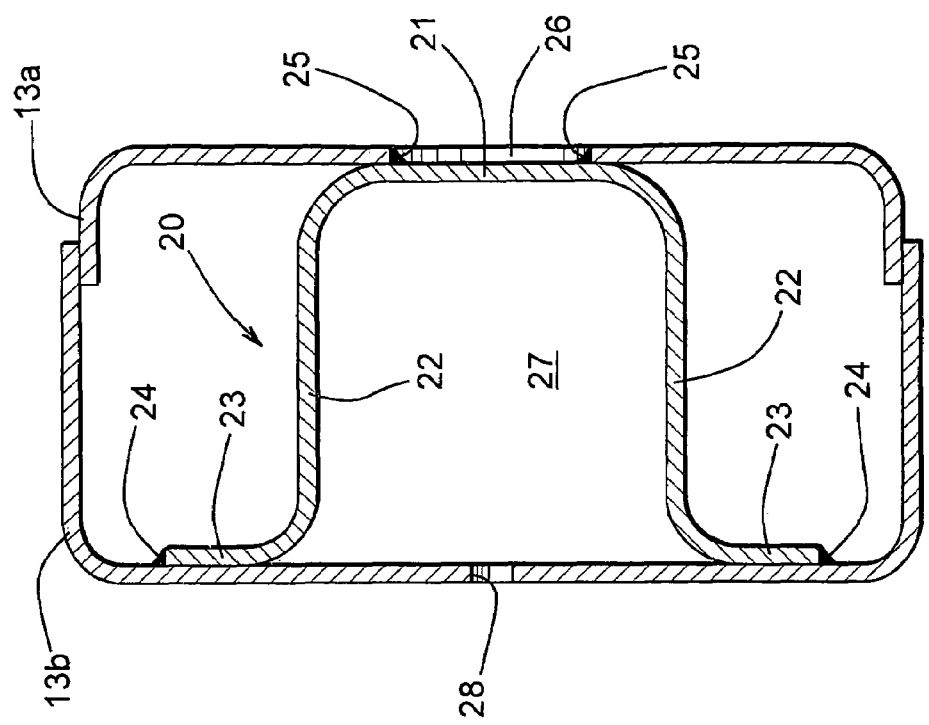
FIG. 4 is a sectional elevational view of the first embodiment of the closed channel structural member and the internal air tank taken along line 4-4 of FIG. 3.
Figure 3:
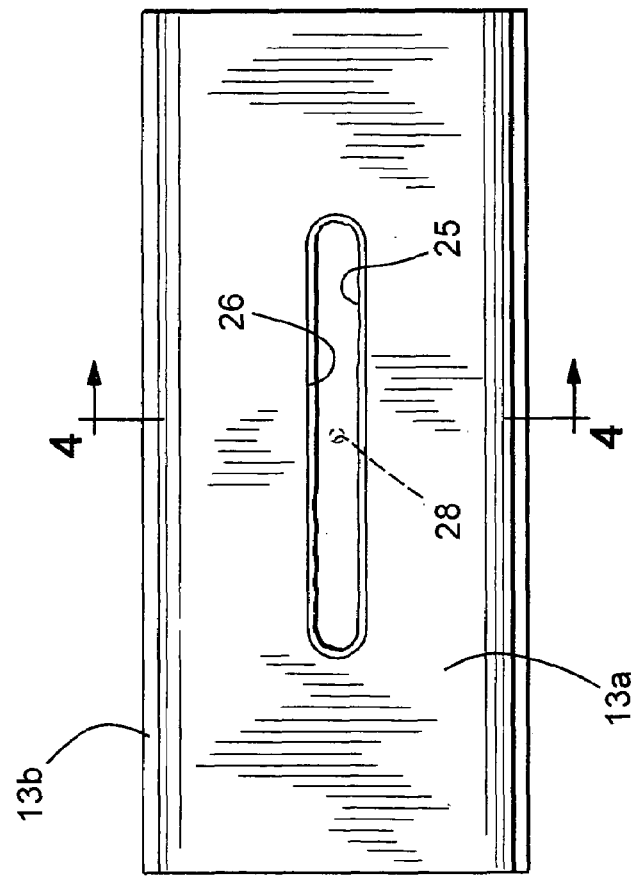
FIG. 3 is a side elevational view of the first embodiment of the closed channel structural member and the internal air tank illustrated in FIGS. 1 and 2.

The structure of the internal air tank 20 is illustrated in detail in FIGS. 2, 3, and 4. As shown therein, the internal air tank 20 is generally cup-shaped, including a closed end portion 21, a plurality of side portions 22, and an outwardly extending flange portion 23 that extends about an open end portion. In the illustrated embodiment, the internal air tank 20 is generally rectangular in shape, having four side portions 22 that extend generally perpendicular to one another. However, the internal air tank 20 may be formed having any desired shape. The flange portion 23 is optional and extends generally perpendicular to some or all of the side portions 22. The flange portion 23 is provided to facilitate securement and sealing of the internal air tank 20 to a portion of one of the side rail section 13b that forms the side rail 13, such as a web portion thereof (i.e., the portion of the C-shaped side rail section 13b that extends between two spaced apart flange portions), as shown in FIG. 4. The flange portion 23 may, for example, be secured to the web portion of the side rail section 13b by a continuous weld 24 or any other desired means.

For additional stability and strength, the closed end portion 21 of the internal air tank 20 may be secured to a portion of the other side rail section 13a that forms the side rail 13, such as the web portion thereof, as also shown in FIG. 4. The closed end portion 21 may, for example, be secured to the web portion of the side rail section 13a by a continuous weld 25 or any other desired means. To facilitate the formation of this weld 25, a slot 26 may be formed through the web portion of the side rail section 13a. The slot 26 provides access to the adjacent regions of the closed end portion 21 of the internal air tank 20 and the web portion of the side rail section 13a by a conventional welding tool (not shown) or other securing apparatus, thereby facilitating the formation of the weld 25.

When secured to the web portion of the side rail section 13b, the internal air tank 20 cooperates with such side rail section 13b, so as to define an air-tight chamber 27 within the side rail 13. The chamber 27 is adapted to selectively receive and store a quantity of a pressurized fluid therein, and further to selectively discharge such pressurized fluid to an auxiliary device. The pressurized fluid may, for example, be air, although any desired fluid may be compressed and stored within the chamber 27. The auxiliary device may, for example, be an active suspension system (not shown) that is provided on the frame portion 10 and/or the body portion 11 of the vehicle. An opening 28 can be formed through the web portion of the side rail section 13b to facilitate fluid communication with the chamber 27. To accomplish this, a conventional fluid fitting (not shown) may be mounted in the opening 28. The fluid fitting communicates with a conventional pressurized fluid circuit (not shown) to selectively store a quantity of a pressurized fluid in the chamber 27, and further to selectively discharge such pressurized fluid from the chamber 27 to an auxiliary device. The pressurized fluid circuit can, for example, include a source of pressurized fluid and one or more control valves that selectively control the storage and discharge of the pressurized fluid in and out of the chamber 27 and to and from the auxiliary device.

Figure 5:
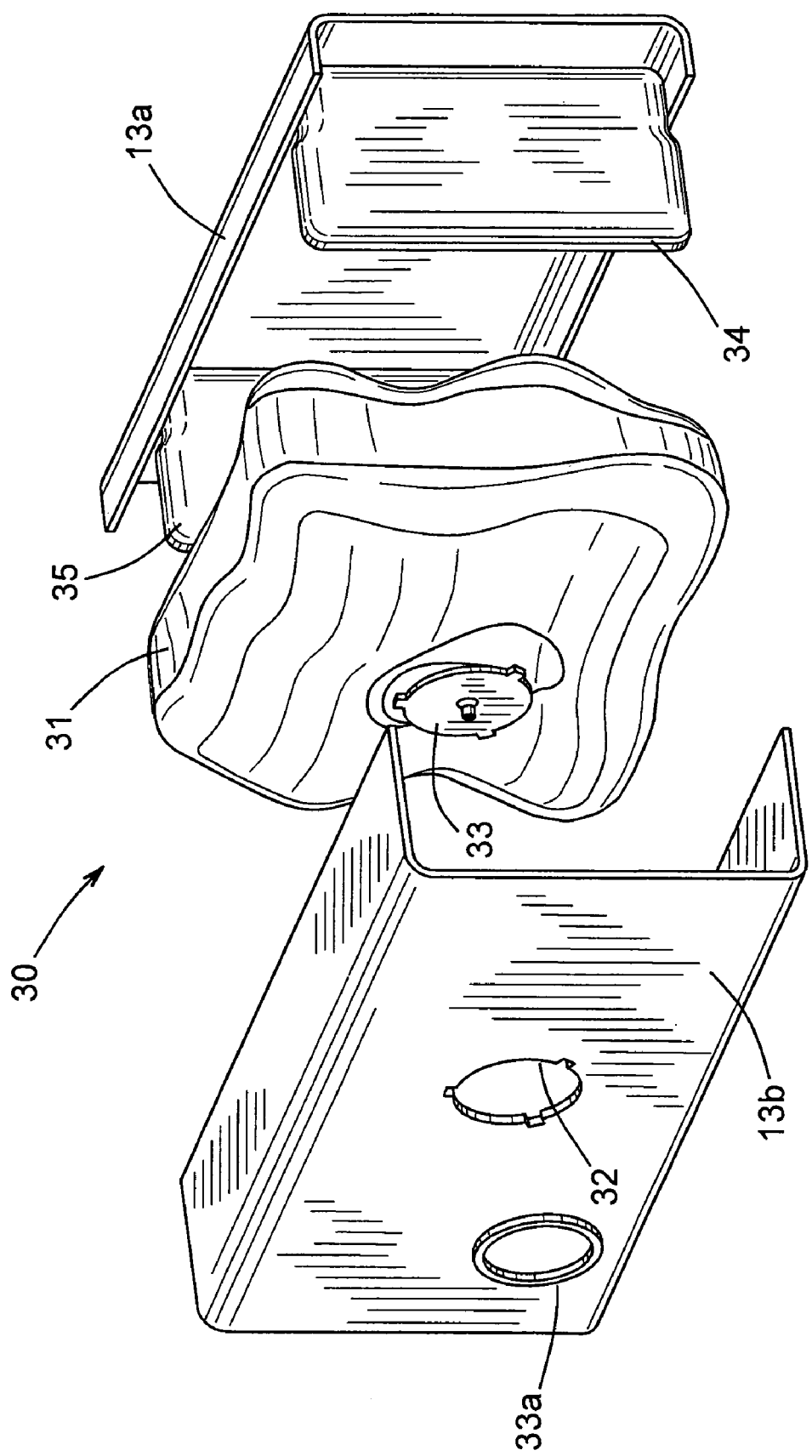
FIG. 5 is an enlarged exploded perspective view of a portion of a second embodiment of a closed channel structural member and an internal air tank in accordance with this invention.

FIG. 5 is an enlarged exploded perspective view of a portion of a second embodiment of an internal air tank, indicated generally at 30, that can be provided within a portion of the side rail 13. The internal air tank 30 includes a bladder 31 having an interior that defines an air-tight chamber within the side rail 13. The bladder 31 may be formed from a flexible material, although such is not required. As discussed above, the chamber defined by the bladder 31 is adapted to selectively receive and store a quantity of a pressurized fluid therein, and further to selectively discharge such pressurized fluid to an auxiliary device. An opening 32 can be formed through the web portion of the side rail section 13b to facilitate fluid communication with the chamber defined by the bladder 31. To accomplish this, a conventional fluid fitting 33 may be mounted in the opening 32 and retained therein by a sealing and locking ring 33a. The fluid fitting 33 communicates with a conventional pressurized fluid circuit (not shown) as discussed above to selectively store a quantity of a pressurized fluid in the chamber defined by the bladder 31, and further to selectively discharge such pressurized fluid from the chamber defined by the bladder 31 to an auxiliary device. If desired, the bladder 31 may be retained within a portion of the side rail 13 by one or more baffle plates 34 and 35. The baffle plates 34 and 35 may be attached to either or both of the interiors of the side rail sections 13a and 13b by any conventional means, such as by welding, riveting, bolting, and the like.

The opening 32 may be sized such that when the bladder 31 is empty, the bladder 31 may be removable through opening 32. This facilitates repair and replacement of the bladder 31 as necessary after the side rail 13 is assembled within the vehicle body and frame assembly. Additionally, the opening 32 may allow the bladder 31 to be inserted within the side rail 13 after the completion of finishing processes of the vehicle body and frame assembly, such as welding and painting.

Figure 6:
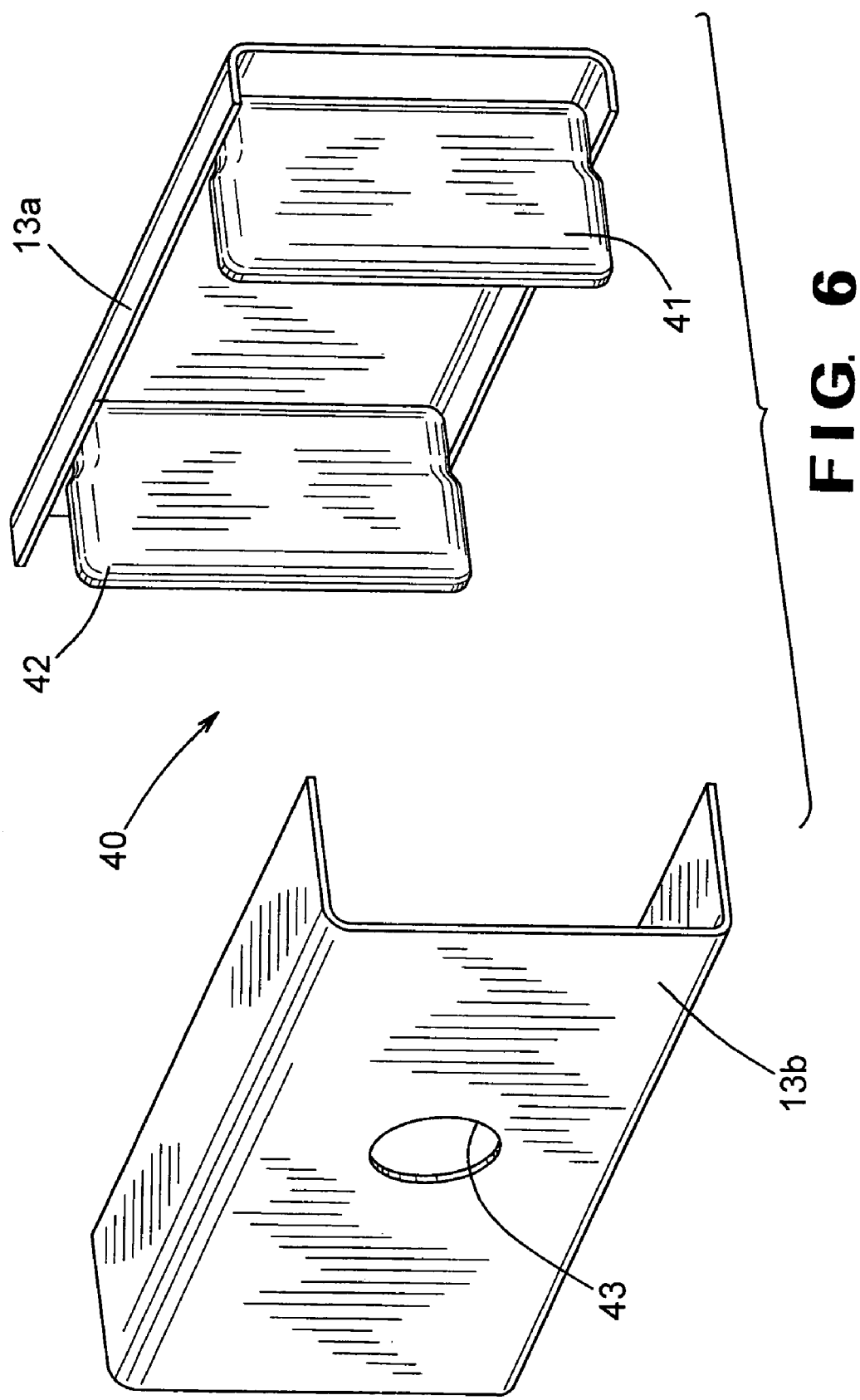
FIG. 6 is an enlarged exploded perspective view of a portion of a third embodiment of a closed channel structural member and an internal air tank in accordance with this invention.

FIG. 6 is an enlarged exploded perspective view of a portion of a third embodiment of an internal air tank, indicated generally at 40, that can be provided within a portion of the side rail 13. The internal air tank 40 is an air-tight chamber defined within the side rail 13 by a pair of baffle plates 41 and 42. The baffle plates 41 and 42 may be attached to either or both of the interiors of the side rail sections 13a and 13b by any conventional means, such as by welding, riveting, bolting, and the like. The baffle plates 41 and 42 cooperate with the side rail sections 13a and 13b to define an air-tight chamber. As discussed above, the chamber defined by the baffle plates 41 and 42 and the side rail sections 13a and 13b is adapted to selectively receive and store a quantity of a pressurized fluid therein, and further to selectively discharge such pressurized fluid to an auxiliary device. An opening 43 may be formed through the web portion of the side rail section 13b to facilitate fluid communication with the chamber defined by the baffle plates 41 and 42 and the side rail sections 13a and 13b, although such is not required. It will be appreciated that the opening 43 may be formed through any portion of the chamber, including one of the baffle plates 41 and 42. To accomplish this, a conventional fluid fitting (not shown) may be mounted in the opening 43. The fluid fitting communicates with a conventional pressurized fluid circuit (not shown) as discussed above to selectively store a quantity of a pressurized fluid in the chamber defined by the baffle plates 41 and 42 and the side rail sections 13a and 13b, and further to selectively discharge such pressurized fluid from the chamber defined by the baffle plates 41 and 42 and the side rail sections 13a and 13b to an auxiliary device.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicular body and frame assembly comprising:
   a plurality of structural components that are connected to form a vehicular body and frame assembly; and
   an internal air tank provided within a portion of at least one of said plurality of structural components, said internal air tank including a closed end portion, a plurality of side portions, and an outwardly extending flange portion that extends about an open end portion.

2. The assembly of claim 1, wherein said internal air tank is generally cup-shaped.

3. The assembly of claim 1, wherein said flange portion of said internal air tank is secured to said portion of at least one of said plurality of structural components by welding.

4. The assembly of claim 1, wherein said closed end portion, said plurality of side portions, and said portion of said at least one of said plurality of structural components define an air-tight chamber.

5. The assembly of claim 4, wherein said air-tight chamber is communicably connected to an opening formed in said portion of said at least one of said plurality of structural components, and further wherein said internal air tank is adapted to selectively discharge pressurized fluid from said air-tight chamber through said opening.

6. The assembly of claim 1, wherein the body and frame assembly is adapted to be connected to and supported by a vehicle suspension system including wheels, axles, resilient members and control arms.

7. A vehicular body and frame assembly comprising:
   a plurality of structural components that are connected to form a vehicular body and frame assembly, at least one of said plurality of structural components having a slot formed therein; and an internal air tank provided within a portion of said at least one of said plurality of structural components and secured to said at least one of said plurality of structural components along said slot.

8. The assembly of claim 7, wherein said internal air tank includes a closed end portion, a plurality of side portions, and an outwardly extending flange portion that extends about an open end portion.

9. The assembly of claim 8, wherein said internal air tank is generally cup-shaped.

10. The assembly of claim 7, wherein said flange portion of said internal air tank is secured to said portion of at least one of said plurality of structural components by welding.

11. The assembly of claim 7, wherein said closed end portion, said plurality of side portions, and said portion of said at least one of said plurality of structural components define an air-tight chamber.

12. The assembly of claim 11, wherein said air-tight chamber is communicably connected to an opening formed in said portion of said at least one of said plurality of structural components, and further wherein said internal air tank is adapted to selectively discharge pressurized fluid from said air-tight chamber through said opening.

13. The assembly of claim 7, wherein the body and frame assembly is adapted to be connected to and supported by a vehicle suspension system including wheels, axles, resilient members and control arms.

* * * * *